United States Patent
Avrahami (10) Patent No.: US 9,367,280 B2
(45) Date of Patent: Jun. 14, 2016

(54) DUAL SCREEN VISIBILITY WITH VIRTUAL TRANSPARENCY

(71) Applicant: Intel Corporation, Santa Clara, CA (US)

(72) Inventor: Daniel Avrahami, Mountain View, CA (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 14/127,551

(22) PCT Filed: Aug. 6, 2013

(86) PCT No.: PCT/US2013/053811
§ 371 (c)(1),
(2) Date: Dec. 19, 2013

(87) PCT Pub. No.: WO2015/020639
PCT Pub. Date: Feb. 12, 2015

(65) Prior Publication Data
US 2015/0042539 A1     Feb. 12, 2015

(51) Int. Cl.
*G06F 3/14*     (2006.01)
*G06F 1/16*     (2006.01)

(52) U.S. Cl.
CPC ............ *G06F 3/1446* (2013.01); *G06F 1/1643* (2013.01); *G06F 1/1647* (2013.01); *G06F 3/1423* (2013.01); *G09G 2300/023* (2013.01); *G09G 2354/00* (2013.01)

(58) Field of Classification Search
CPC ..... G06F 3/011; G06F 3/0425; G06F 3/0428; G06F 3/1431; G06F 3/14; G06F 3/1446; G06F 3/1423; G06F 1/1647; G09G 2300/023; G09G 2354/00

USPC .............................. 345/1.1–1.3, 2.1, 173–179
See application file for complete search history.

(56) References Cited

U.S. PATENT DOCUMENTS

| | | | |
|---|---|---|---|
| 8,593,401 B1* | 11/2013 | Kim ...................... | G06F 1/1647 345/1.1 |
| 2011/0163986 A1* | 7/2011 | Lee et al. ...................... | 345/173 |
| 2011/0205163 A1* | 8/2011 | Hinckley et al. ............... | 345/173 |
| 2012/0060089 A1* | 3/2012 | Heo et al. ...................... | 715/702 |
| 2014/0045553 A1* | 2/2014 | Shimada ....................... | 455/566 |

FOREIGN PATENT DOCUMENTS

JP      2008083510      * 4/2008
WO   WO 2012/147522    * 11/2012

* cited by examiner

*Primary Examiner* — Md Saiful A Siddiqui
(74) *Attorney, Agent, or Firm* — Grossman, Tucker, Perreault & Pfleger, PLLC (57) ABSTRACT

Generally, this disclosure provides devices, systems and methods to provide dual screen visibility with virtual transparency. A device may include a dual-sided display element to display a first image on a first side of the display element and to display a second image on a second side of the display element; an activation detection module to detect a user request to initiate the dual screen visibility mode; an image processing module to generate a horizontally transposed version of the second image; and an image rendering module. The image rendering module may be capable of, in response to the initiation request, displaying the horizontally transposed version on the first side of the display element and adjusting a relative transparency between the first image and the displayed horizontally transposed version.

29 Claims, 7 Drawing Sheets

DUAL SCREEN VISIBILITY WITH VIRTUAL TRANSPARENCY

FIELD

The present disclosure relates to dual screen visibility and, more particularly, to dual screen visibility with virtual transparency.

BACKGROUND

Some computer systems combine the display element features of a laptop and a tablet by providing dual screens: one on each side of the lift open cover (or top half) of the laptop. When the laptop is closed, only the outer screen is visible and the computer may function as a tablet. When the laptop is open (also known as clamshell mode), the inner screen becomes visible and typically serves as the primary screen. Some of these computer systems, however, permit the simultaneous use of both inner and outer screens while operating in clamshell mode. When both screens are in use, though, the user can generally only see what is presented on the screen in front of them. The content of the screen facing away from the user is not visible. The user may wish to known what is being displayed on the away-facing screen, particularly if that content is changing dynamically.

BRIEF DESCRIPTION OF THE DRAWINGS

Features and advantages of embodiments of the claimed subject matter will become apparent as the following Detailed Description proceeds, and upon reference to the Drawings, wherein like numerals depict like parts, and in which:

Although the following Detailed Description will proceed with reference being made to illustrative embodiments, many alternatives, modifications, and variations thereof will be apparent to those skilled in the art.

DETAILED DESCRIPTION

Generally, this disclosure provides devices, systems and methods to provide dual screen visibility with virtual transparency. A dual-sided display element may be configured to display a first image on one side and a second image on the other side of the display element. A user request to initiate the dual screen visibility mode may be detected in the form of a key press, a touch gesture or other suitable mechanism. The dual screen visibility mode increases the transparency of the first image and generates a horizontally transposed (left-right flipped) version of the second image to be displayed as an additional layer along with the first image, such as, for example a layer beneath the first image. This creates a virtual transparency effect on the display element where the user seems able to view the second image, from the other side of the display element, through the first image. In some embodiments, the transition into dual screen visibility mode may proceed as a gradual transition through a number of intermediate transparency levels. In some embodiments the virtual transparency effect may be achieved by decreasing the transparency of the horizontally transposed image or by any combination of relative transparency adjustments between the first image and the horizontally transposed image.

Figure 1A:
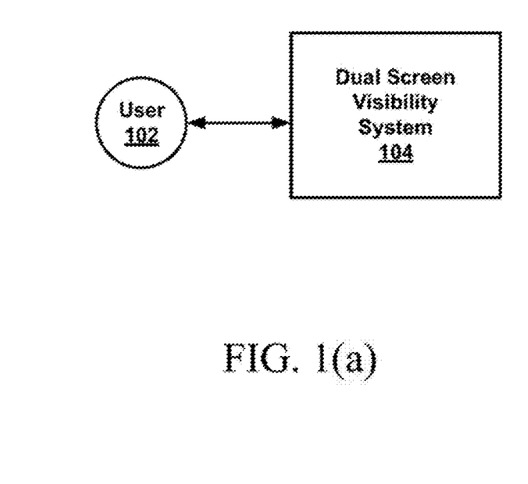
FIGS. 1(a) and 1(b) illustrate a top level system diagram of one example embodiment consistent with the present disclosure.
Figure 1B:
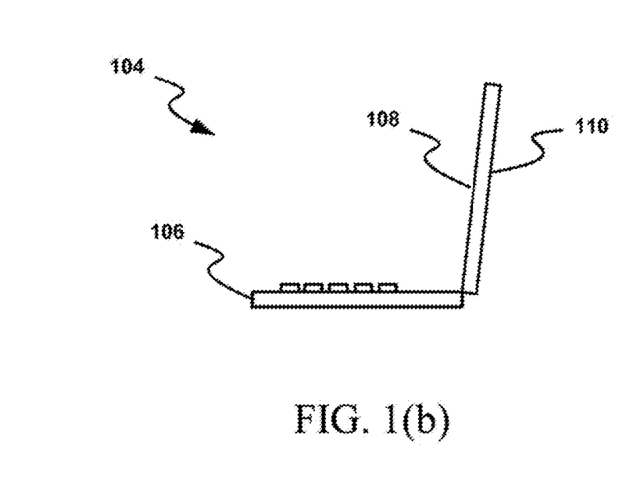

FIGS. 1(a) and 1(b) illustrates a top level system diagram of one example embodiment consistent with the present disclosure. In FIG. 1(a) a user 102 is shown to view a first side of the dual screen visibility system 104, which will be described in greater detail below. In some embodiments, the dual screen visibility system 104 may be implemented on a laptop computing device, tablet, notebook, workstation, phone, smartphone. Ultrabook or any other mobile computing device or suitable device that includes a dual screen display element capable of providing two viewing screens that face in different directions. For example, in FIG. 1(b), the lift-open cover/screen of a laptop, Ultrabook or notebook computer 106 may provide a dual sided display element that includes a first display element side 108 on the inside of the cover and a second display element side 110 on the outside of the cover. In some embodiments, there may be a keyboard, touchscreen, microphone or other suitable input device. The touchscreen may be included in display element 108 for example.

Figure 2:
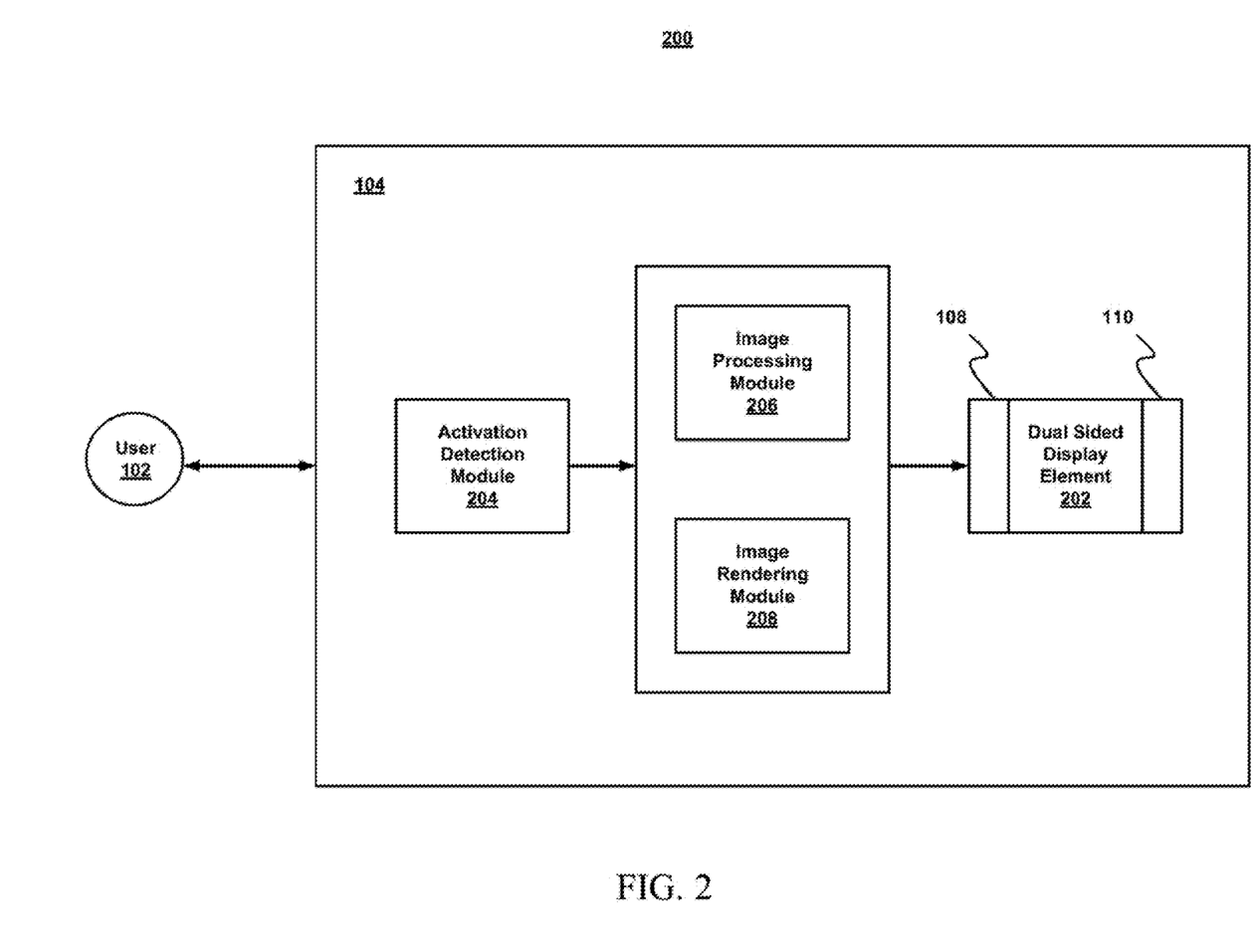
FIG. 2 illustrates a block diagram of one example embodiment consistent with the present disclosure.

FIG. 2 illustrates a block diagram 200 of one example embodiment consistent with the present disclosure. The dual screen visibility system 104 is shown to include an activation detection module 204, an image processing module 206, an image rendering module 208 and a dual sided display element 202 that includes a first display element side 108 and a second display element side 110. Activation detection module 204 may be configured to detect a request, for example by the user 102, to initiate or terminate dual screen visibility mode. In some embodiments, the request may be detected as a key press or keystroke. In some embodiments, the request may be detected as a touch gesture, for example a multi-finger touch gesture on a touch screen. The touch screen may be one of the display elements 108 or 110. Any other suitable request detection mechanism may also be employed to signal a change in the dual screen visibility mode, including a voice command or a mouse event. The request to terminate the dual screen visibility mode may include the lifting of fingers or hand from the touch screen, reverting the touch gesture, or releasing the pressed key.

The dual-sided display element 202 may be configured to display a first image on the first side 108 of the display element and to display a second image on the second side 110 of the display element, as shown for example in FIG. 3 to be discussed below. One of the sides, either 108 or 110, may face the user and the other side may face away from the user. For purposes of the following discussion it will be assumed that side 108 faces the user and that the first image is therefore visible to the user prior to activation of the dual screen visibility mode, while the second image is generally not visible to the user.

Image processing module 206 may be configured to generate a horizontally transposed version of the second image, that is to say a copy of the second image flipped left to right as would be seen, for example, in a mirror. In some embodiments, the second image may be copied from a frame butler, associated with the second side 110 of the display element, to another buffer, for example in a region of general purpose system memory, where the horizontal transposition may be performed. The horizontally transposed image simulates the view that the user would have of the second image if the dual-sided display element 202 were in fact transparent and the user was therefore viewing the second image from behind. The image processing module 206 may generate this horizontally transposed image when the dual screen visibility mode is enabled. The horizontally transposed version of the second image may be updated dynamically as the second image changes or it may be updated at any suitable periodic interval. It will be appreciated that the update interval may be pre-determined or adjustable, for example, based on user preferences.

Image rendering module 208 may be configured to increase the transparency of the first image and display the horizontally transposed version of the second image on the first side of the display element, such that the horizontally transposed version is visible through the increased transparency of the first image. Although the following discussion describes an increase (and subsequent decrease) of the transparency of the first image, it will be appreciated that in some embodiments the virtual transparency effect may be achieved in a similar manner by decreasing the transparency of the horizontally transposed image or, indeed, by any combination of relative transparency adjustments between the first image and the horizontally transposed image. The resulting virtual transparency effect enables the horizontally transposed version of the second image to be displayed as an additional layer along with the first image. In some embodiments, the horizontally transposed version may appear as a layer beneath the first image.

The image rendering module 208 may perform these operations when the dual screen visibility mode is enabled. The transparency may be increased from an initial low value, for example zero percent transparency or fully opaque, to a higher value, for example in the range of 50 to 80% transparent. The range of transparency adjustment may also be pre-determined or adjustable, for example, based on user preferences.

In some embodiments, the relative transparency changes between the images may be adjusted through a number of intermediate values between the initial value and the final value to create a smooth visual transitioning effect. Each of the intermediate transparency values may be displayed for a short period of time, for example in the approximate range of 500 msec. In some embodiments, the transparency of the first image may be adjusted over incremental regions of the first side of the display element, for example from one edge of the display element to an opposite edge. The virtual transparency effect may thus appear to gradually transition from the bottom of the screen to the top of the screen, from the left of the screen to the right of the screen or from the point where the user touches the screen outwards to the edges. The time period of the virtual transparency transition may be pre-determined or adjustable, for example, based on user preferences.

In response to a request to exit or terminate the dual screen visibility mode, the image rendering module 208 may decrease the transparency of the first image so that the second image may no longer be visible. The transparency may be decreased back to a low level, such as, for example, zero percent. In some embodiments, the transparency decrease (or reversion) may also be performed as a sequence of adjustment through intermediate values as described above in connection with the initiation of dual screen visibility mode, such that the transparency effect appears to gradually diminish over time. The time period of the virtual transparency reversion associated with mode exit may be pre-determined or adjustable, for example, based on user preferences, and, in some embodiments, may be shorter than the time period for the virtual transparency transition associated with mode initiation.

Further in response to a request to exit the dual screen visibility mode, the image processing module 206 may be configured to cease generating additional horizontally transposed versions of the second image.

Figure 3A:
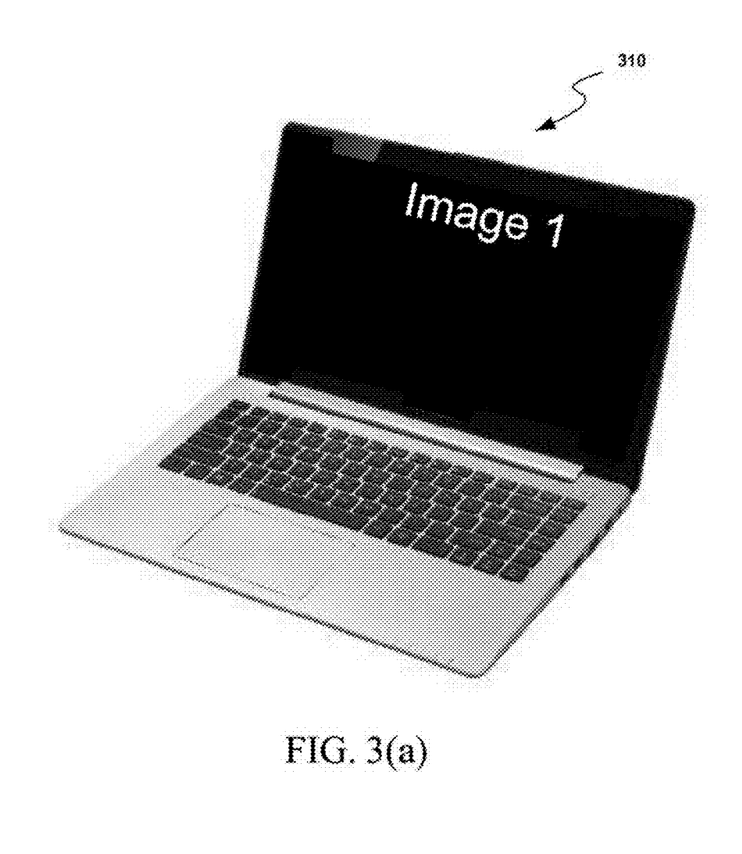
FIGS. 3(a) and 3(b) illustrate a dual screen display element of one example embodiment consistent with the present disclosure.
Figure 3B:
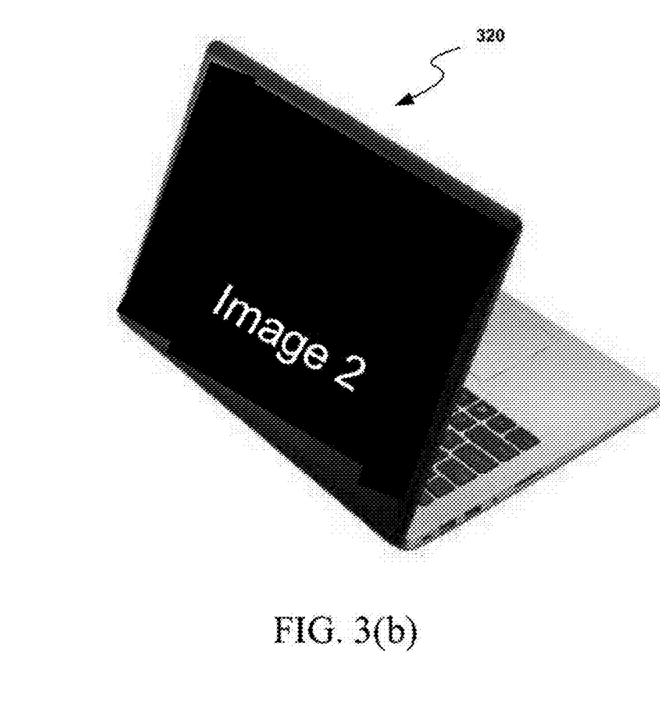

FIGS. 3(*a*) and 3(*b*) illustrate a dual screen display element of one example embodiment consistent with the present disclosure. The dual screen display element is shown in FIG. 3(*a*) to have a first display element side 310. The dual screen display element is shown in FIG. 3(*b*) to have a second display element side 320. The system is illustrated as a laptop computing device operating in clamshell mode, where the cover is opened to reveal both display element sides 310 and 320. In these figures, display element side 310, which is displaying a first image, is facing the user while display element side 320, displaying a second image, is facing away from the user and therefore not readily visible to the user.

Figure 4:
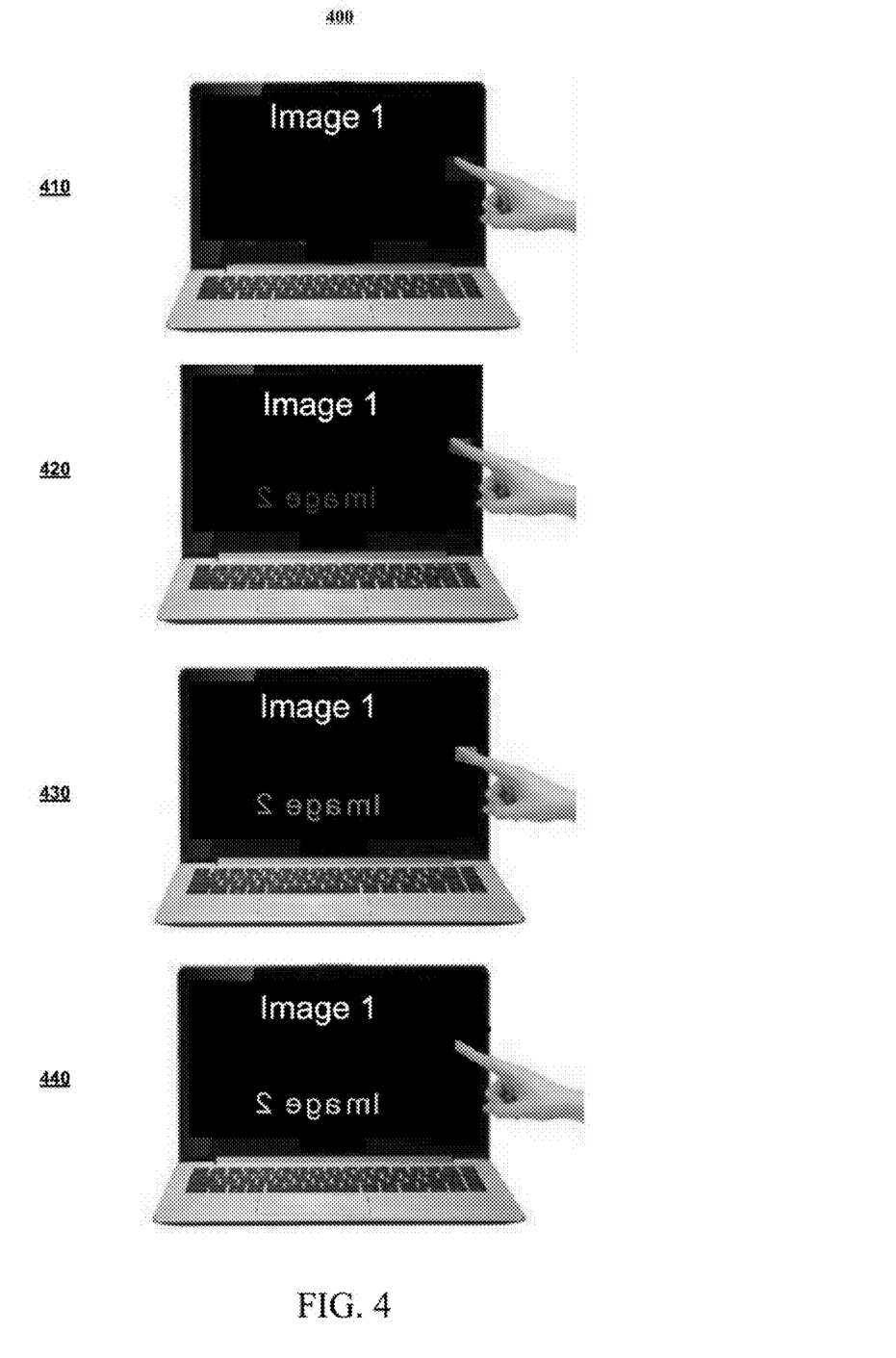
FIG. 4 illustrates a virtual transparency transition of one example embodiment consistent with the present disclosure.

FIG. 4 illustrates a virtual transparency transition 400 of one example embodiment consistent with the present disclosure. The transition is illustrated as four snapshots 410, 420, 430 and 440 of the first display element side 310 over a time period associated with the transition. At the beginning of the transition 410, only the first image is visible, for example with a transparency of zero percent. At a subsequent time in the transition 420, the transparency of the first image is increased by an initial percentage to begin to reveal the horizontally transposed second image beneath the first image. At the next subsequent time in the transition 430, the transparency of the first image is increased further, to increasingly reveal the horizontally transposed second image beneath the first image. At the end of the transition 440, the transparency of the first image is increased to a final value providing the highest degree of reveal of the horizontally transposed second image beneath the first image.

Figure 5:
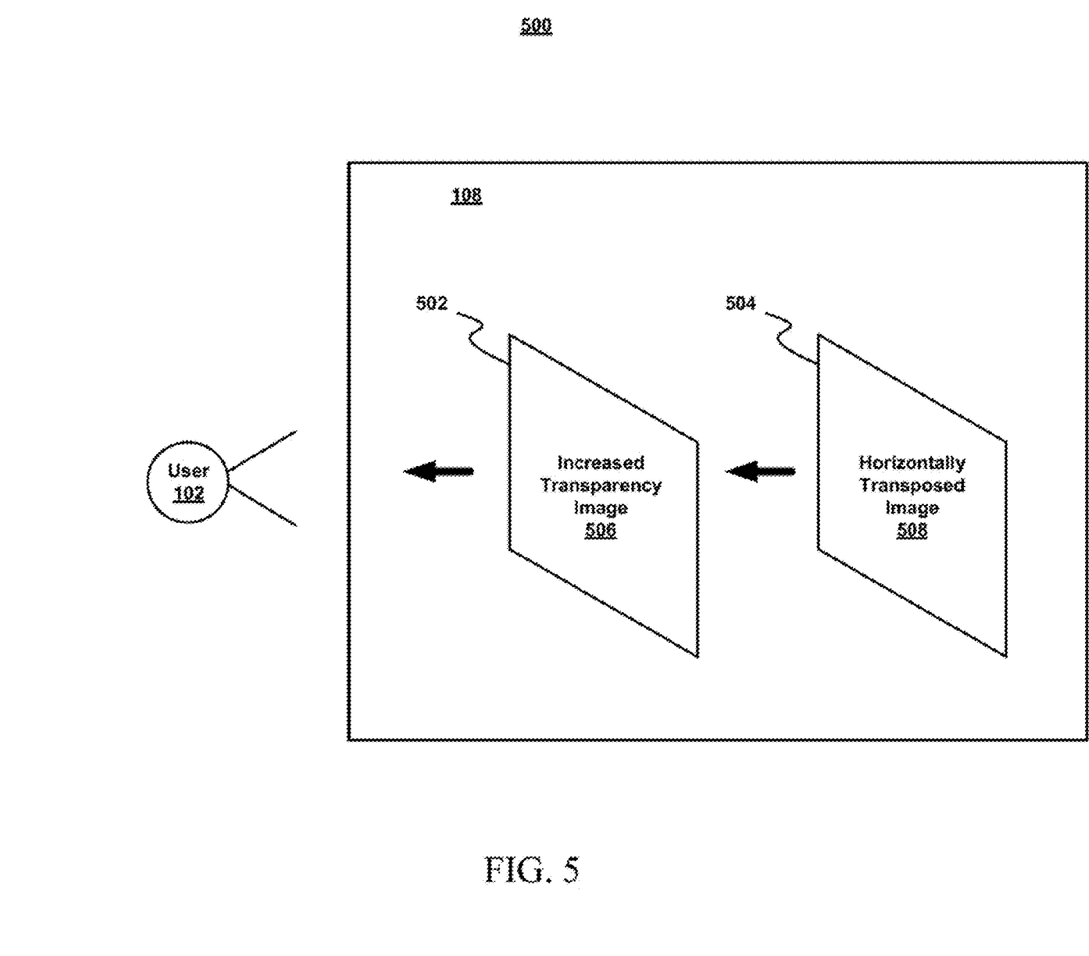
FIG. 5 illustrates image layers of one example embodiment consistent with the present disclosure.

FIG. 5 illustrates image layers 500 of one example embodiment consistent with the present disclosure. In dual screen visibility mode, the image presented to user 102, for example on first display element side 108, may be composed of at least two layers 502 and 504. Layer 504 may include the horizontally transposed image version 508 of the second image from the second display element side 110, as described previously. Layer 502 may include the increased transparency version 506 of the first image from the first display element side 108, as described previously. Image 506 is shown to overlay image 508. The increased transparency of image 506, however, allows image 508 to be visible to the user through image 506 to an extent that varies as the transparency is increased and decreased.

Figure 6:
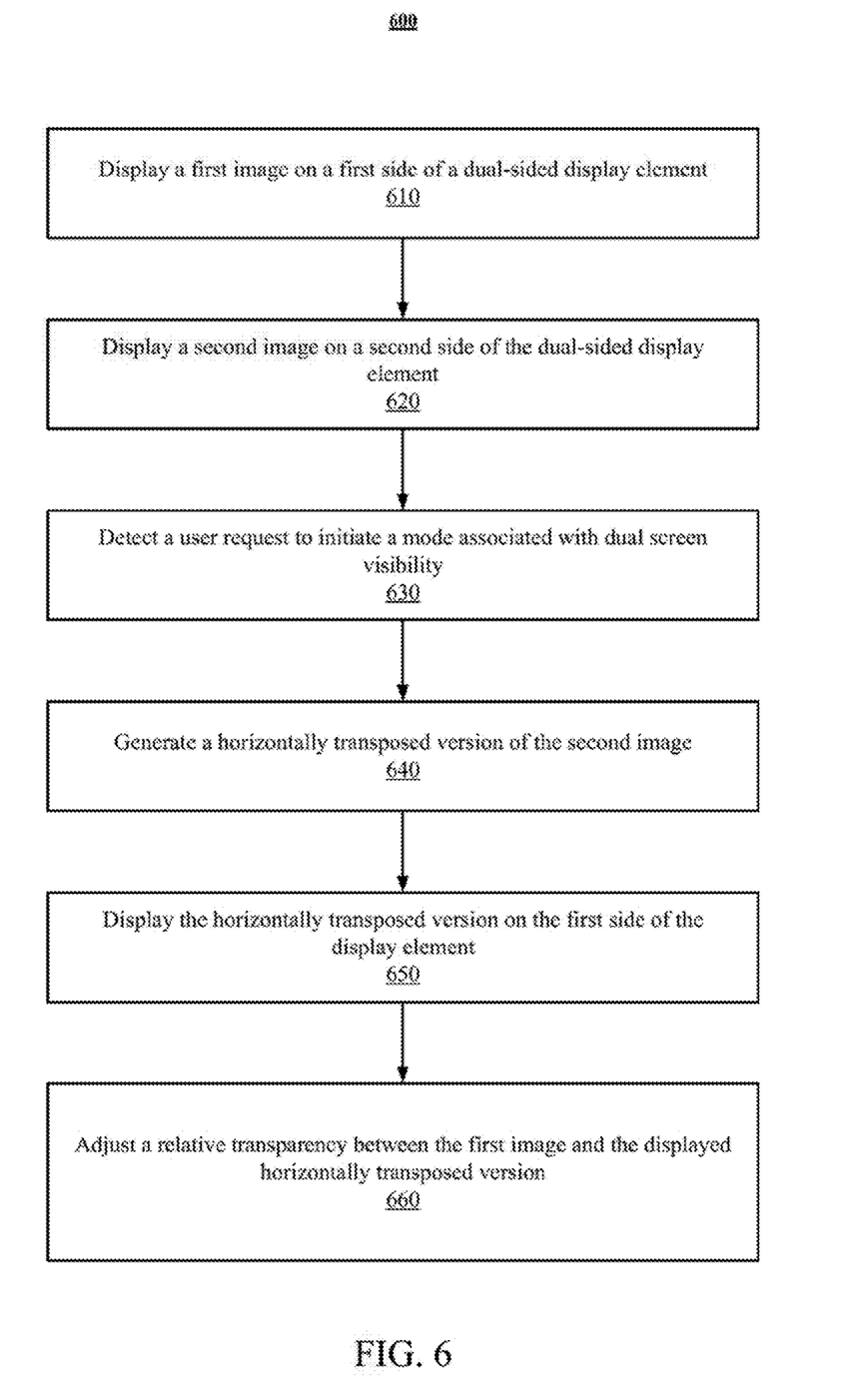
FIG. 6 illustrates a flowchart of operations of one example embodiment consistent with the present disclosure.

FIG. 6 illustrates a flowchart of operations 600 of one example embodiment consistent with the present disclosure. At operation 610, a first image is displayed on a first side of a dual-sided display element. The first side may be facing towards a user of the system. At operation 620, a second image is displayed on a second side of the display element. The second side may be facing away from the user. At operation 630, a user request to initiate a mode associated with dual screen visibility is detected. At operation 640, a horizontally transposed version of the second image is generated. At operation 650, the horizontally transposed version is displayed on the first side of the display element in response to detecting the initiation request. At operation 660, a relative transparency is adjusted between the first image and the displayed horizontally transposed version.

Figure 7:
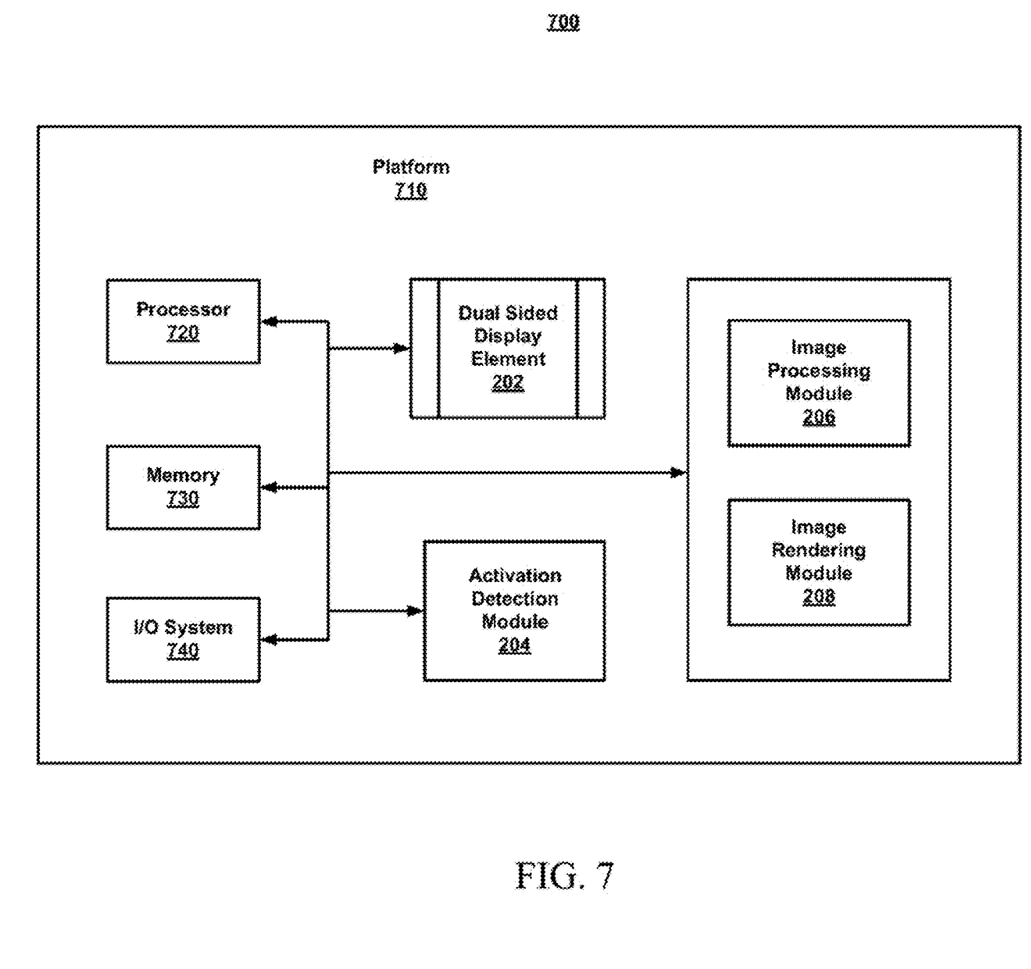
FIG. 7 illustrates a platform of one example embodiment consistent with the present disclosure.

FIG. 7 illustrates a system diagram 700 of a platform 710 of one example embodiment consistent with the present disclosure. Platform 710 may be a computing or communication device, such as, for example, a laptop computer, tablet, notebook, workstation, phone, smartphone, Ultrabook or any other computing device whether mobile or stationary. Platform 710 may include a processor 720, memory 730, an input/output (I/O) system 740 and a dual sided display element 202 as described previously. The I/O system 740 may include a keyboard, mouse, touchscreen, gesture input/detection, microphone or any other suitable I/O device. Platform 710 may further include activation detection module 204, image processing module 206 and image rendering module 208 configured to provide a dual screen visibility mode as described previously.

Embodiments of the methods described herein may be implemented in a system that includes one or more storage mediums having stored thereon, individually or in combination, instructions that when executed by one or more processors perform the methods. Here, the processor may include, for example, a system CPU (e.g., core processor) and/or programmable circuitry. Thus, it is intended that operations according to the methods described herein may be distributed across a plurality of physical devices, such as processing structures at several different physical locations. Also, it is intended that the method operations may be performed individually or in a subcombination as would be understood by one skilled in the art. Thus, not all of the operations of each of the flowcharts need to be performed, and the present disclosure expressly intends that all subcombinations of such operations are enabled as would be understood by one of ordinary skill in the art.

The storage medium may include any type of tangible medium, for example, any type of disk including floppy disks, optical disks, compact disk read-only memories (CD-ROMs), compact disk re-writables (CD-RWs), digital versatile disks (DVDs) and magneto-optical disks, semiconductor devices such as read-only memories (ROMs), random access memories (RAMs) such as dynamic and static RAMs, erasable programmable read-only memories (EPROMs), electrically erasable programmable read-only memories (EEPROMs), flash memories, magnetic or optical cards, or any type of media suitable for storing electronic instructions.

"Circuitry," as used in any embodiment herein, may comprise, for example, singly or in any combination, hardwired circuitry, programmable circuitry, state machine circuitry, and/or firmware that stores instructions executed by programmable circuitry. An app may be embodied as code or instructions which may be executed on programmable circuitry such as a host processor or other programmable circuitry. A module, as used in any embodiment herein, may be embodied as circuitry. The circuitry may be embodied as an integrated circuit, such as an integrated circuit chip.

Thus, the present disclosure provides devices, systems, methods, computer readable media and platforms to provide dual screen visibility with virtual transparency. The following examples pertain to further embodiments.

The device may include a dual-sided display element configured to display a first image on a first side of the display element and to display a second image on a second side of the display element. The device of this example may also include an activation detection module configured to detect a user request to initiate the dual screen visibility mode. The device of this example may further include an image processing module configured to generate a horizontally transposed version of the second image. The device of this example may further include an image rendering module configured to, in response to the initiation request: display the horizontally transposed version on the first side of the display element; and adjust a relative transparency between the first image and the displayed horizontally transposed version.

Another example device includes the forgoing components and the relative transparency is adjusted by increasing the transparency of the first image such that the horizontally transposed version is visible through the increased transparency first image.

Another example device includes the forgoing components and the relative transparency is adjusted by decreasing the transparency of the horizontally transposed version such that the horizontally transposed version is visible through the first image.

Another example device includes the forgoing components and the activation detection module is further configured to detect the user request to initiate the dual screen visibility mode in response to a key-press and/or to a multi-finger touch gesture on a touchscreen.

Another example device includes the forgoing components and the activation detection module is further configured to detect a user request to terminate the dual screen visibility mode in response to a key-press and/or to a multi-finger touch gesture on a touchscreen.

Another example device includes the forgoing components and the transparency increase is a transition from zero percent transparency to an adjustable transparency.

Another example device includes the forgoing components and the adjustable transparency is in a range of 50 percent to 80 percent transparency.

Another example device includes the forgoing components and a time period of the transition is adjustable.

Another example device includes the forgoing components and the image rendering module is further configured to decrease the transparency of the first image in response to the termination request.

Another example device includes the forgoing components and the image rendering module is further configured to incrementally render the horizontally transposed version on the first side of the display element, and the incremental rendering begins at a first edge of the display element and continues to a second edge of the display element.

Another example device includes the forgoing components and the image rendering module is further configured to incrementally render the horizontally transposed version on the first side of the display element, and the incremental rendering begins at a point of a user touch on the display element and continues outwards to edges of the display element.

According to another aspect there is provided a method. The method may include displaying a first image on a first side of a dual-sided display element. The method of this example may also include displaying a second image on a second side of the display element. The method of this example may further include detecting a user request to initiate a mode associated with the dual screen visibility. The method of this example may further include generating a horizontally transposed version of the second image. The method of this example may further include displaying the horizontally transposed version on the first side of the display element in response to detecting the initiation request. The method of this example may further include adjusting a relative transparency between the first image and the displayed horizontally transposed version in response to detecting the initiation request.

Another example method includes the forgoing operations and further includes adjusting the relative transparency by increasing the transparency of the first image such that the horizontally transposed version is visible through the increased transparency first image.

Another example method includes the forgoing operations and the user request to initiate a mode associated with the dual screen visibility is detected in response to a key-press and/or to a multi-finger touch gesture on a touchscreen.

Another example method includes the forgoing operations and further includes detecting a user request to terminate a mode associated with the dual screen visibility in response to a key-press and/or to a multi-finger touch gesture on a touchscreen.

Another example method includes the forgoing operations and the transparency increase is a transition from zero percent transparency to an adjustable transparency.

Another example method includes the forgoing operations and the adjustable transparency is in a range of 50 percent to 80 percent transparency.

Another example method includes the forgoing operations and a time period of the transition is adjustable.

Another example method includes the forgoing operations and further includes decreasing the transparency of the first image in response to the termination request.

Another example method includes the forgoing operations and further includes incrementally rendering the horizontally transposed version on the first side of the display element, and the incremental rendering begins at a first edge of the display element and continues to a second edge of the display element.

Another example method includes the forgoing operations and further includes incrementally rendering the horizontally transposed version on the first side of the display element, and the incremental rendering begins at a point of a user touch on the display element and continues outwards to edges of the display element.

According to another aspect there is provided a platform. The platform may include a processor, an input/output module coupled to the processor and a memory coupled to the processor. The platform of this example may also include a dual-sided display element coupled to the processor, the display element configured to display a first image on a first side of the display element and to display a second image on a second side of the display element. The platform of this example may further include an activation detection module configured to detect a user request to initiate the dual screen visibility mode. The platform of this example may further include an image processing module configured to generate a horizontally transposed version of the second image. The platform of this example may further include an image rendering module configured to, in response to the initiation request: display the horizontally transposed version on the first side of the display element; and adjust a relative transparency between the first image and the displayed horizontally transposed version.

Another example platform includes the forgoing components and the relative transparency is adjusted by increasing the transparency of the first image such that the horizontally transposed version is visible through the increased transparency first image.

Another example platform includes the forgoing components and the activation detection module is further configured to detect the user request to initiate the dual screen visibility mode in response to a key-press and/or to a multi-finger touch gesture on a touchscreen.

Another example platform includes the forgoing components and the activation detection module is further configured to detect a user request to terminate the dual screen visibility mode in response to a key-press and/or to a multi-finger touch gesture on a touchscreen.

Another example platform includes the forgoing components and the transparency increase is a transition from zero percent transparency to an adjustable transparency.

Another example platform includes the forgoing components and the adjustable transparency is in a range of 50 percent to 80 percent transparency.

Another example platform includes the forgoing components and a time period of the transition is adjustable.

Another example platform includes the forgoing components and the image rendering module is further configured to decrease the transparency of the first image in response to the termination request.

Another example platform includes the forgoing components and the image rendering module is further configured to incrementally render the horizontally transposed version on the first side of the display element, and the incremental rendering begins at a first edge of the display element and continues to a second edge of the display element.

Another example platform includes the forgoing components and the image rendering module is further configured to incrementally render the horizontally transposed version on the first side of the display element, and the incremental rendering begins at a point of a user touch on the display element and continues outwards to edges of the display element.

According to another aspect there is provided a system. The system may include a means for displaying a first image on a first side of a dual-sided display element. The system of this example may also include a means for displaying a second image on a second side of the display element. The system of this example may further include a means for detecting a user request to initiate a mode associated with the dual screen visibility. The system of this example may further include a means for generating a horizontally transposed version of the second image. The system of this example may further include a means for increasing transparency of the first image in response to detecting the initiation request. The system of this example may further include a means for displaying the horizontally transposed version on the first side of the display element in response to detecting the initiation request, such that the horizontally transposed version is visible through the increased transparency first image.

Another example system includes the forgoing components and the user request to initiate a mode associated with the dual screen visibility is detected in response to a key-press and/or to a multi-finger touch gesture on a touchscreen.

Another example system includes the forgoing components and further includes a means for detecting a user request to terminate a mode associated with the dual screen visibility in response to a key-press and/or to a multi-finger touch gesture on a touchscreen.

Another example system includes the forgoing components and the transparency increase is a transition from zero percent transparency to an adjustable transparency.

Another example system includes the forgoing components and the adjustable transparency is in a range of 50 percent to 80 percent transparency.

Another example system includes the forgoing components and a time period of the transition is adjustable.

Another example system includes the forgoing components and further includes a means for decreasing the transparency of the first image in response to the termination request.

Another example system includes the forgoing components and further includes a means for incrementally rendering the horizontally transposed version on the first side of the display element, and the incremental rendering begins at a first edge of the display element and continues to a second edge of the display element.

Another example system includes the forgoing components and further includes a means for incrementally rendering the horizontally transposed version on the first side of the display element, and the incremental rendering begins at a point of a user touch on the display element and continues outwards to edges of the display element.

According to another aspect there is provided at least one computer-readable storage medium having instructions stored thereon which when executed by a processor, cause the processor to perform the operations of the method as described in any of the examples above.

According to another aspect there is provided an apparatus including means to perform a method as described in any of the examples above.

The terms and expressions which have been employed herein are used as terms of description and not of limitation, and there is no intention, in the use of such terms and expressions, of excluding any equivalents of the features shown and described (or portions thereof), and it is recognized that various modifications are possible within the scope of the claims. Accordingly, the claims are intended to cover all such equivalents. Various features, aspects, and embodiments have been described herein. The features, aspects, and embodiments are susceptible to combination with one another as well as to variation and modification, as will be understood by those having skill in the art. The present disclosure should, therefore, be considered to encompass such combinations, variations, and modifications.

What is claimed is:

1. A device to provide a dual screen visibility mode, said device comprising:
   a non-transparent dual-sided display element to display a first image on a first side of said display element and to display a second image on a second side of said display element;
   an activation detection module to detect a user request to initiate said dual screen visibility mode;
   an image processing module to generate a horizontally inverted version of said second image; and
   an image rendering module to, in response to said initiation request:
   display said horizontally inverted version on said first side of said display element;
   adjust a relative transparency between said first image and said displayed inverted version; and
   incrementally rendering said horizontally inverted version on said first side of said display element, wherein said incremental rendering either begins at a first edge of said display element and continues to a second edge of said display element and/or begins at a point of a user touch on said display element and continues outwards to edges of said display element.

2. The device of claim 1, wherein said relative transparency is adjusted by increasing the transparency of said first image such that said horizontally inverted version is visible through said increased transparency first image.

3. The device of claim 2, wherein said transparency increase is a transition from zero percent transparency to an adjustable transparency.

4. The device of claim 3, wherein said adjustable transparency is in a range of 50 percent to 80 percent transparency.

5. The device of claim 3, wherein a time period of said transition is adjustable.

6. The device of claim 1, wherein said relative transparency is adjusted by decreasing the transparency of said horizontally inverted version such that said horizontally inverted version is visible through said first image.

7. The device of claim 1, wherein said activation detection module is further capable of detecting said user request to initiate said dual screen visibility mode in response to an action selected from the group consisting of a key-press and a multi-finger touch gesture on a touchscreen.

8. The device of claim 1, wherein said activation detection module is further capable of detecting a user request to terminate said dual screen visibility mode in response to an action selected from the group consisting of a key-press and a multi-finger touch gesture on a touchscreen.

9. The device of claim 8, wherein said image rendering module is further capable of decreasing said transparency of said first image in response to said termination request.

10. The device of claim 1, wherein said incremental rendering begins at a first edge of said display element and continues to a second edge of said display element.

11. The device of claim 1, wherein said incremental rendering begins at a point of a user touch on said display element and continues outwards to edges of said display element.

12. One or more non-transitory computer-readable storage memories having instructions stored thereon, singularly or in combination, which when executed by one or more processors result in the following operations for dual screen visibility, said operations comprising:
    displaying a first image on a first side of a non-transparent dual-sided display element;
    displaying a second image on a second side of said display element;
    detecting a user request to initiate a mode associated with said dual screen visibility;
    generating a horizontally inverted version of said second image;
    incrementally rendering and displaying said horizontally inverted version on said first side of said display element, wherein said incremental rendering either begins at a first edge of said display element and continues to a second edge of said display element and/or begins at a point of a user touch on said display element and continues outwards to edges of said display element; and
    adjusting a relative transparency between said first image and said displayed horizontally inverted version.

13. The one or more computer-readable storage memories of claim 12, further comprising adjusting said relative transparency by increasing the transparency of said first image such that said horizontally inverted version is visible through said increased transparency first image.

14. The one or more computer-readable storage memories of claim 12, wherein said user request to initiate a mode associated with said dual screen visibility is detected in response to an action selected from the group consisting of a key-press and a multi-finger touch gesture on a touchscreen.

15. The one or more computer-readable storage memories of claim 12, further comprising the operation of detecting a user request to terminate a mode associated with said dual screen visibility in response to an action selected from the group consisting of a key-press and a multi-finger touch gesture on a touchscreen.

16. The one or more computer-readable storage memories of claim 15, further comprising the operation of decreasing said transparency of said first image in response to said termination request.

17. The one or more computer-readable storage memories of claim 12, wherein said transparency increase is a transition from zero percent transparency to an adjustable transparency.

18. The one or more computer-readable storage memories of claim 17, wherein said adjustable transparency is in a range of 50 percent to 80 percent transparency.

19. The one or more computer-readable storage memories of claim 17, wherein a time period of said transition is adjustable.

20. The one or more computer-readable storage memories of claim 12, wherein said incremental rendering begins at a first edge of said display element and continues to a second edge of said display element.

21. The one or more computer-readable storage memories of claim 12, wherein said incremental rendering begins at a point of a user touch on said display element and continues outwards to edges of said display element.

22. A platform comprising:
a processor;
an input/output module coupled to said processor;
a memory coupled to said processor;
a non-transparent dual-sided display element coupled to said processor, said display element to display a first image on a first side of said display element and to display a second image on a second side of said display element;
an activation detection module to detect a user request to initiate said dual screen visibility mode;
an image processing module to generate a horizontally inverted version of said second image; and
an image rendering module to, in response to said initiation request:
display said horizontally inverted version on said first side of said display element;
adjust a relative transparency between said first image and said displayed horizontally inverted version; and
incrementally rendering said horizontally inverted version on said first side of said display element, wherein said incremental rendering either begins at a first edge of said display element and continues to a second edge of said display element and/or begins at a point of a user touch on said display element and continues outwards to edges of said display element.

23. The platform of claim 22, wherein said relative transparency is adjusted by increasing the transparency of said first image such that said horizontally inverted version is visible through said increased transparency first image.

24. The platform of claim 22, wherein said activation detection module is further capable of detecting said user request to initiate said dual screen visibility mode in response to an action selected from the group consisting of a key-press and a multi-finger touch gesture on a touchscreen.

25. The platform of claim 22, wherein said activation detection module is further capable of detecting a user request to terminate said dual screen visibility mode in response to an action selected from the group consisting of a key-press and a multi-finger touch gesture on a touchscreen.

26. The platform of claim 22, wherein said transparency increase is a transition from zero percent transparency to an adjustable transparency.

27. The platform of claim 26, wherein said adjustable transparency is in a range of 50 percent to 80 percent transparency.

28. The platform of claim 22, wherein said incremental rendering begins at a first edge of said display element and continues to a second edge of said display element.

29. The platform of claim 22, wherein said incremental rendering begins at a point of a user touch on said display element and continues outwards to edges of said display element.

* * * * *